United States Patent [19]

Shindo

[11] Patent Number: 5,017,005
[45] Date of Patent: May 21, 1991

[54] FOCAL POINT DETECTING OPTICAL APPARATUS

[75] Inventor: Osamu Shindo, Tokyo, Japan

[73] Assignee: Asahi Kogaku Kogyo Kabushiki Kaisha, Tokyo, Japan

[21] Appl. No.: 324,715

[22] Filed: Mar. 17, 1989

[30] Foreign Application Priority Data

Mar. 18, 1988 [JP] Japan .................................. 63-64836

[51] Int. Cl.$^5$ ............................ G01B 9/00; G02B 7/09
[52] U.S. Cl. ................................. 356/125; 250/201.2; 354/402
[58] Field of Search ...................... 356/125; 250/201.2; 354/402, 406, 407, 408

[56] References Cited

U.S. PATENT DOCUMENTS

| | | |
|---|---|---|
| 4,185,191 | 1/1980 | Stauffer . |
| 4,563,576 | 1/1986 | Matsumura et al. ................. 250/204 |

FOREIGN PATENT DOCUMENTS

| | | |
|---|---|---|
| 3803305 | 8/1989 | Fed. Rep. of Germany ...... 354/402 |
| 54-159259 | 12/1979 | Japan . |
| 61-157046 | 7/1986 | Japan . |
| 62-095511 | 5/1987 | Japan . |
| 63-013010 | 1/1988 | Japan . |
| 63-278012 | 11/1988 | Japan . |
| 2183419 | 6/1987 | United Kingdom . |

OTHER PUBLICATIONS

English translation of the Abstract for Japanese Patent No. 61-157046.
English translation of the Abstract for Japanese Patent No. 63-013010.

Primary Examiner—F. L. Evans
Attorney, Agent, or Firm—Sandler, Greenblum & Bernstein

[57] ABSTRACT

A focal point detecting optical apparatus has a focal point detecting optical system on an optical axis for reimaging a portion of a primary image formed in the vicinity of an optical axis through a taking lens on a row of light receiving elements linearly arranged by as a pair of images and detecting a focusing state in the vicinity of the optical axis; a focal point detecting optical system outside an optical axis for reimaging a portion of the primary image formed outside the optical axis on the row of light receiving elements and detecting a focusing state outside the optical axis; and light deflecting means disposed in the vicinity of an imaging surface on which the primary image is formed and deflecting beam of light outside the optical axis toward the optical axis side.

9 Claims, 6 Drawing Sheets

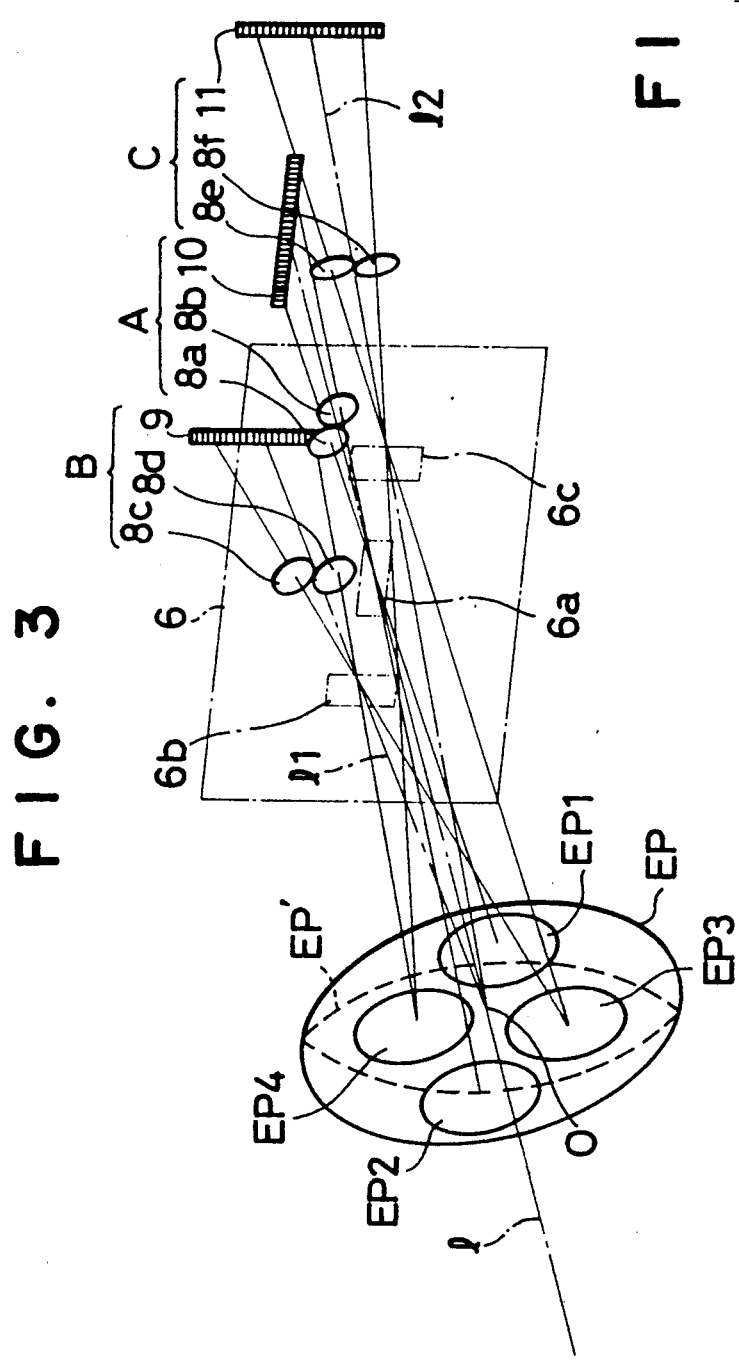
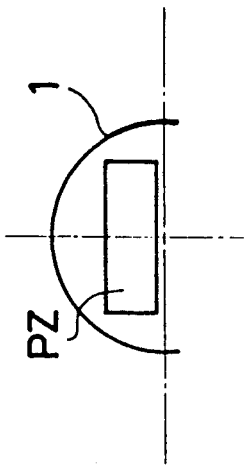
FIG. 3
FIG. 4

FOCAL POINT DETECTING OPTICAL APPARATUS

BACKGROUND OF THE INVENTION

1. Field of the Invention

This invention relates to a focal point detecting apparatus for detecting a focusing state of an optical system for use in, for example, cameras or the like, and more particularly to a facal point detecting optical apparatus for the use of multi range finding work in which a focusing state is detected at several places on an optical axis of a taking lens and outside the optical axis.

2. Description of the Prior Art

Conventional focal point detecting optical apparatus for multi range finding work includes range finding zones which are spaced apart so that beams of light of focal point detecting optical systems will now be interfered with each other. Therefore, images which are reform for detecting a focal point are spaced apart and light receiving elements (e.g., CCD line sensors) are impossible to be formed in positions proximate to each other.

Therefore, in case light receiving elements are located on one chip, a substrate becomes large. On the contrary, in case elements are located on independent substrates, verification of alignment of optical axes, etc. must be performed per each substrate. In any case, the space occupied by the sensor portion becomes large. As a result, AF (Auto Focus) module becomes large as a whole and costs are increased.

In view of the above, inventors of the present invention propose a constitution, in which prisms 4,5, as shown in FIG. 8, are disposed behind condenser lenses 1,3 adapted to receive beam of light outside an optical axis 1 of a taking lens (not shown) so that a reimaging position will approach to the optical axis 1 (japanese patent application No. Sho. 63-64836).

Beam of light made incident from the taking lens is defined in three zones (range finding zones) by a field mask 6 which is provided in such a manner as to be coincident with an imaging surface, and a pair of images of an object to be photographed are reimaged on each CCD sensor 9,10,11 through condenser lenses 1,2,3, prisms 4,5, a diaphragm mask 7, and a separator lens 8.

According to this constitution, the beam of light coming from the range finding zone outside the optical axis 1 of the taking lens is bent toward the optical axis 1 side by means of the function of the prism 4,5 and by means of prism function due to eccentricity of the condenser lenses 1,3. Therefore, the reimaging positions can be approached to each other, and the substrate 12 provided with the CCD line sensors 9,10,11 as well as the whole AF module can be made small.

However, with this constitution, since the deflecting angle of an optical path for a focal point detecting optical system located outside the optical axis 1 is comparatively large, when the substrate 12 is adjusted its position toward the optical axis direction, the CCD line sensors 9,10,11 deviate from the position covering the range finding zones by slight movement.

Also, in order to make the thickness of the prism 4 smaller than a predetermined value, the deflecting angle cannot be produced only by the function of the prism 4. Therefore, the prism function due to the eccentricity of the condenser lens 1 is also utilized as mentioned above. Therefore, a passing zone PZ of the beam of light, as shown in FIG. 9, becomes the peripheral portion of the condenser lens 1. In order to obtain this zone PZ, the outer diameter of the lens and the central thickness thereof become large and the generation of aberration is large, too.

Furthermore, since the space between the imaging surface and the prism 4 is large, there arises such a problem as that lateral chromatic aberration is large.

BRIEF DESCRIPTION OF THE DRAWINGS

FIG. 3 is a perspective view schematically showing the arrangement of a focal point detecting optical system;

FIG. 4 is a schematic view showing a relation between a condenser lens and a passing zone for beam of light in the optical system of FIG. 1;

SUMMARY OF THE INVENTION

The object of the present invention is to provide a focal point detecting optical apparatus for solving the abovementioned problems by making a deflecting angle of beam of light outside a taking lens small and in which generation of chromatic aberration can be reduced.

And, in order to achieve this object, the present invention is characterized in that a light deflecting means adapted to deflect beam of light outside the optical axis toward the optical axis side is disposed in the vicinity of an imaging surface on which a primary image is formed through a taking lens.

DETAILED DESCRIPTION OF THE EMBODIMENTS

The embodiments of a focal point detecting optical apparatus according to the present invention will be described hereunder with reference to the accompanying drawings.

Figure 1:
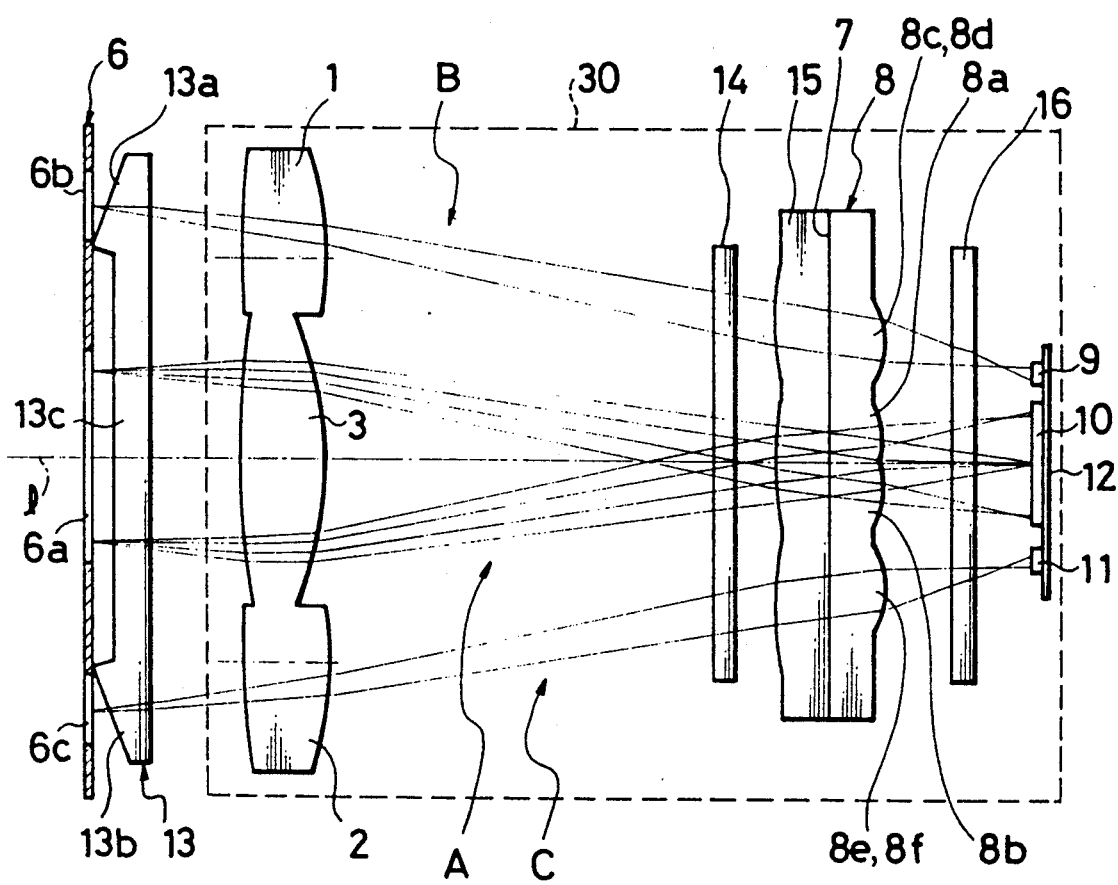
FIG. 1 is a schematic view of an optical system showing one embodiment of a focal point detecting optical apparatus according to the present invention.
Figure 2:
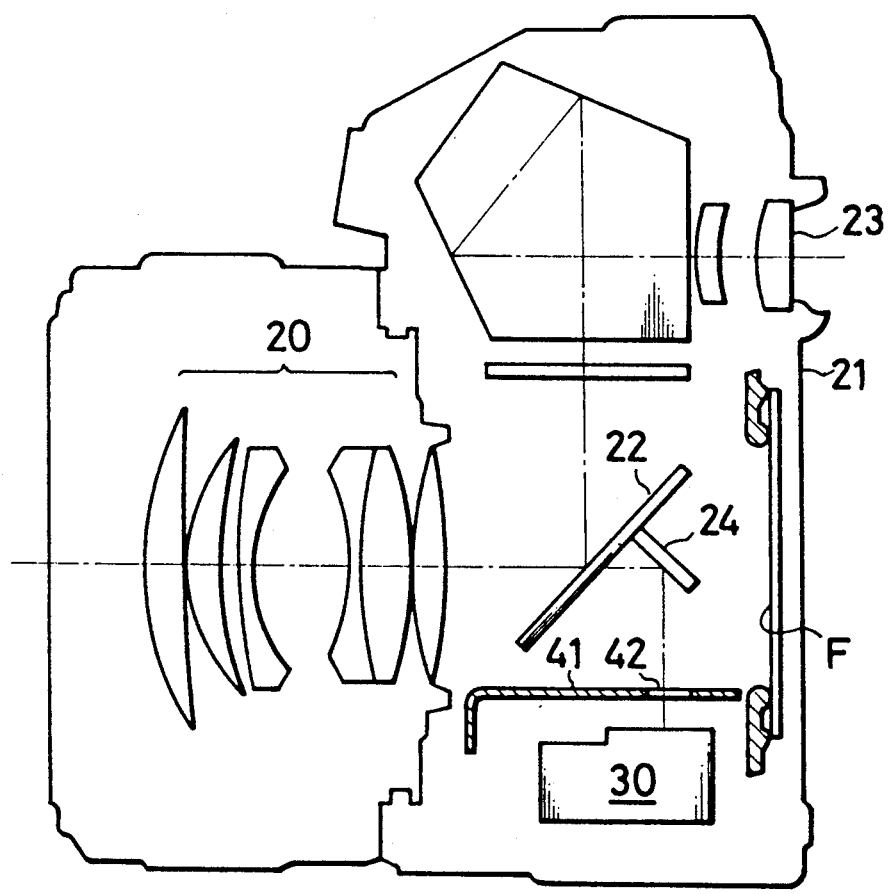
FIG. 2 is a schematic view of a camera which is provided with the above-mentioned apparatus.

FIG. 1 through FIG. 3 show one embodiment, in which a focal point detecting optical apparatus of the present invention is applied to an automatic focusing device of a camera.

FIG. 2 is a schematic view showing the whole structure of a camera. In the figure, 20 denotes a taking lens removably mounted on a camera body 21, 22 denotes a main mirror adapted to guide taking beam of light to a finder 23, and 24 denotes a submirror adapted to guide taking beam of light, which has passed through the main mirro 22, to an AF module 30. F denotes a film surface, 41 denotes a shading plate, and 42 denotes an opening formed in the shading plate 41.

FIG. 3 conceptually shows an optical system of the AF module 30.

This apparatus comprises a focal point detecting optical system A on an optical axis adapted to detect a focusing state of the taking lens 20 in the vicinity of its optical axis l, and focal point detecting optical systems B,C outside an optical axis disposed at both sides of the focal point detecting optical system A on an optical axis and adapted to detect a focusing state of the taking lens 20 outside its optical axis l. Each of the focal point detecting optical systems comprises a splitting and reimaging lens system comprising a condenser lens (see FIG. 1) and separator lenses 8a through 8f, and CCD line sensors (light receiving elements) 9,10,11.

In FIG. 3, the central axis of the focal point detecting optical system A is in alignment with the optical axis l of the taking lens 20 . l1 denotes a center axis of the focal point detecting optical system B, and l2 denotes a center axis of the focal point detecting optical systme C. The optical axis l of the taking lens and the center axes l1,l2 are intersected with each other at the center 0 of an exit pupil EP of the taking lens 20.

Beam of light made incident from the taking lens 20 forms a primary image of an object to be photographed on a field mask 6 which is disposed at position optically conjugated with the film surface F. The image of the object is sharply formed on the field mask 6 when the taking lens 20 is well focused.

The exit pupil EP of the taking lens 20, when looked from a central range finding zone 6a, is generally circular as shown by a solid line, whereas an axis pupil EP', when looked from peripheral range finding zones 6b, 6c, is generally elliptical as shown by a broken line due to the affection of vignetting.

Each of the separator lenses 8a through 8f is optically conjugated with the taking lens 20 through a condenser lens.

And, the separator lenses 8a, 8b of the focal point detecting optical system A on an optical axis are disposed in the horizontal direction in the figure and are faced with imaginary opening areas EP1, EP2 of the exit pupil EP of the taking lens 20 through the central range finding zone 6a. Beams of light, which have passed through the opening areas EP1, EP2, are taken into the separator lenses 8a, b, and a pair of images are reimaged on the CCD line sensor 10.

The separator lenses 8c, 8d, 8e, 8f of the focal point detecting optical system B,C outside an optical axis are disposed in the vertical direction in FIG. 3 respectively and are faced with opening areas EP3,EP4 in the vertical direction of the exit pupil EP through the peripheral range finging zones 6b,6c. Beams of light, which have passed through the opening areas EP3,EP4, are taken into the separator lenses 8c,8d, 8e,8f, and a pair of images are reimaged on the CCD line sensors 9, 11 respectively. The separator lenses of the focal point detecting optical systems B,C outside an optical axis are disposed in the vertical direction as mentioned because a base line length between the lenses can be obtained long enough avoiding the affection of vignetting.

FIG. 1 is a detailed illustration of the AF module 30.

The AF module 30 is contained at its portion encircled by a broken line in a case as one rigid body.

Between the field mask 6 and the Af module 30, a prism block 13 as a light deflecting means is disposed proximate to the field mask 6, i.e., in the vicinity of an imaging surface on which a primary image of the object is formed by the taking lens 20.

This prism block 13 includes prism portions 13a,13b which are disposed in such a manner as to correspond to the peripheral range finding zones 6b,6c of the field mask 6, and a parallel plane portion 13c which is disposed in such a manner as to correspond to the central range finding zone 6a.

The thickness of the parallel plane portion 13c is set to be equal to the thickness of the central portion of each of the prism portions 13a,13b. Due to the foregoing arrangement, the optical path length difference between the beam of light of the optical axis l portion and the beam of light of outside the optical axis l due to the provision of the prism can be reduced.

The separator lenses 8a through 8f are integrally formed on one lens substrate 8. Also, three CCD line sensors 9,10,11 are integrally formed on one substrate 12.

Between the condenser lens and the separator lens, there is disposed an infrared cutoff filter 14.

The separator lens substrate 8 is attached with an auxiliary lens 15 at its light incident side so that quantity of light will be uniformly distributed in order to diminish distortion. Between the auxiliary lens 15 and the separator substrate 8, a diaphragm mask 7 is interposed. Reference numeral 16 denotes a cover glass of the line sensor.

In the focal point detecting optical system A on an optical axis, beam of light, which has passed though the central range finding zone 6a of the field mask 6 and now in the vicinity of the optical axis l, is split and reimaged on the CCD line sensor as a pair of images by the condenser lens 3 and the separator lenses 8a,8b.

The distance between the images on the CCD line sensors 10 is generally proportional to ther defocus quantity of the taking lens 20. Therefore, by calculating the distance between the images, there can be obtained a defocus state of the taking lens 20 with respect to the object in an area corresponding to the central range finding zone 6a.

In the two focal point detecting optical systems B,C outside an optical axis, beams of light, which have passed through the peripheral range finding zones 6b,6c of the field mask 6 and now outside the optical axis l, are deflected toward the optical axis l side by the prism portions 13a, 13b respectively and then split and reimaged on the CCD line sensors 9,11 as a pair of images by the condenser lenses 1,2 and the pair of separator lenses 8c,8d, 8e,8f.

The defocus state of the taking lens 20 with respect to the object in the area corresponding to the peripheral range finding zones 6b,6c can be detected in accordance with output powers of the CCD line sensors 9,11.

A photographer selects a range finding zone which covers the object to be focused. An automatic focusing device drives the taking lens 20 to the focused position in accordance with the defocus direction and the defocus quantity corresponding to such selected range finding zone.

By means of a provision of a prism in the vicinity of an imaging surface by a taking lens, the distance between a beam deflecting position and a CCD line sensor can be made larger than that of the prior art, and a deflecting angle of the beam of light outside the optical axis side can be set comparatively small toward the optical axis l.

By virtue of the comparatively small deflecting angle, the following effects can be obtained.

(1) The accuracy of positional adjustment in the direction along the optical axis of the CCD line sensor is not required to be so strict as the prior art.

That is, since the deflecting angle is small, when the CCD line sensor is moved toward the optical axis, it is difficult to be moved away from the area of beam of light which is made incident from a predetermined range finding zone.

(2) The vertical angle of the prism can be made comparatively small.

Therefore, the thickness of the prism can be made comparatively thin.

(3) By virtue of the above-mentioned (2), additional employment of the prism function due to eccentricity of a condenser lens is not required, even in case the thickness of the prism is restricted to the degree of the prior art.

Therefore, the passing area PZ of the beam of light, as shown in FIG. 4 can be located in the vicinity of the optical axis of the condenser lens, and the effective diameter of the condenser lens can be obtained without making the thickness of the central portion of the lens large. Also, there can be restricted the occurrence of aberration caused by using the peripheral portion of the lens.

On the other hand, by means of a provision of the prism in the vicinity of the imaging surface, lateral chromatic aberration can be reduced.

Figure 5:
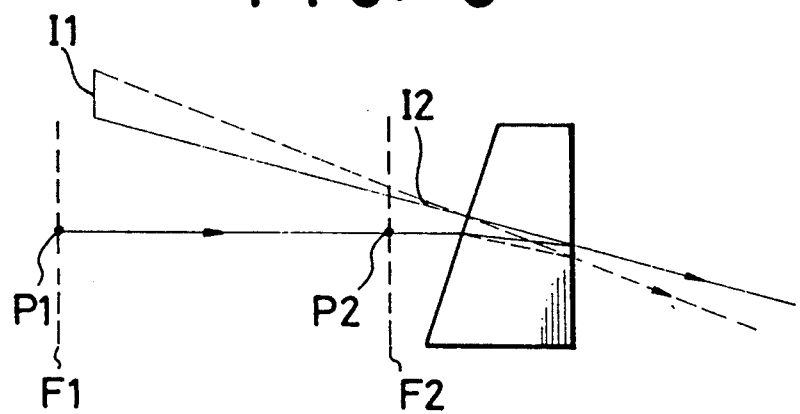
FIG. 5 is a schematic view showing a relation between a position of an imaging surface and generation of chromatic aberration.

Beam of light coming from one point of the imaging surface, as shown in FIG. 5, has a predetermined spreading angle as shown by a solid line and a broken line because the refractive index of a prism is different depending on wavelength. This is the lateral chromatic aberration.

In case the imaging surface, as indicated by F1, is located away from the prism 13a, an apparent image 11 formed on the imaging surface at its point P1 has a comparatively large spread when looked from the CCD line sensor side.

On the contrary, in case the imaging surface, as indicated by F2 in FIG. 5, is located proximate to a prism 13a as in the embodiment of FIG. 1, an apparent image 12 formed on the imaging surface F2 at its point P2 has only a comparatively small spread when looked from the CCD line sensor side.

This fact suggests that the shorter the distance between the imaging surface and the prism is, the more extensively the chromatic aberration can be reduced.

Figure 6:
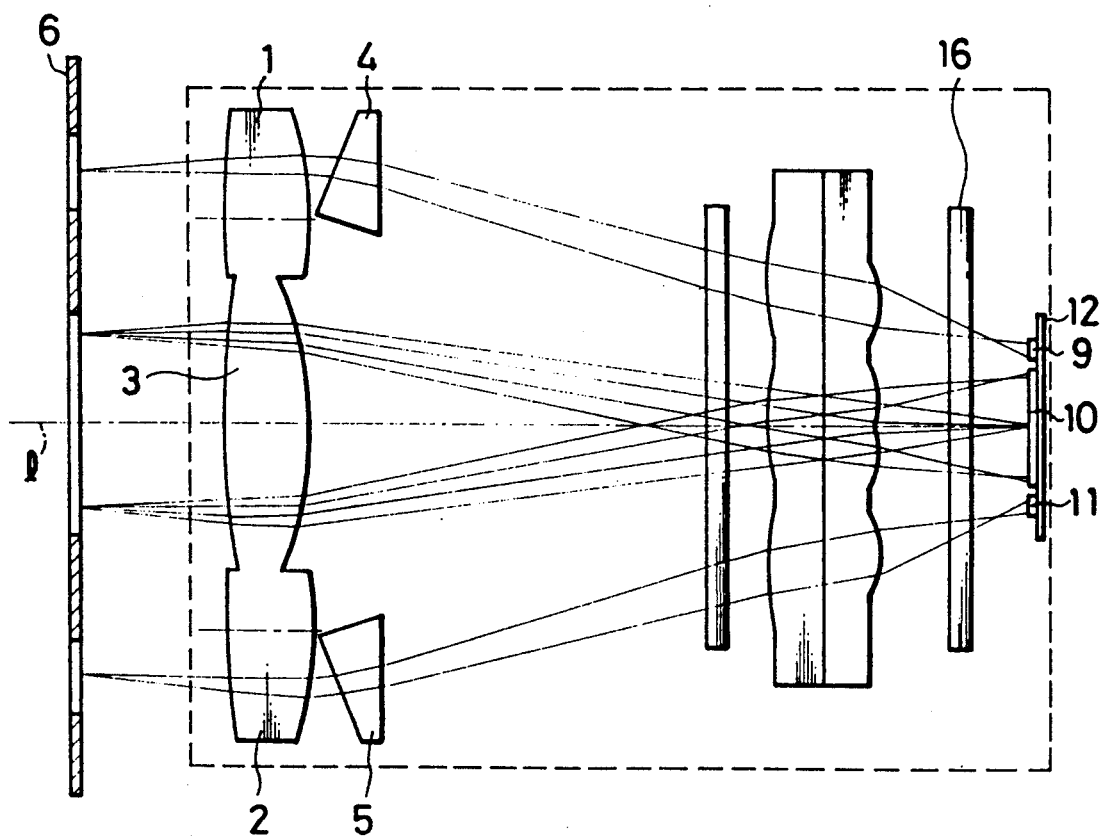
FIG. 6 is a schematic view showing a reference example of a focal point detecting optical apparatus which is different from the above-mentioned apparatus only in position of the arrangement of the prism.

FIG. 6 shows a reference example, which is different only in arrangement of the prism from the embodiment of FIG. 1, and identical parts of the above embodiment are denoted by identical reference numberals. In the constitution of FIG. 6, the distance between the imaging surface and the prism is longer than that of FIG. 1, but the remaining constitution is the same.

Figure 7:
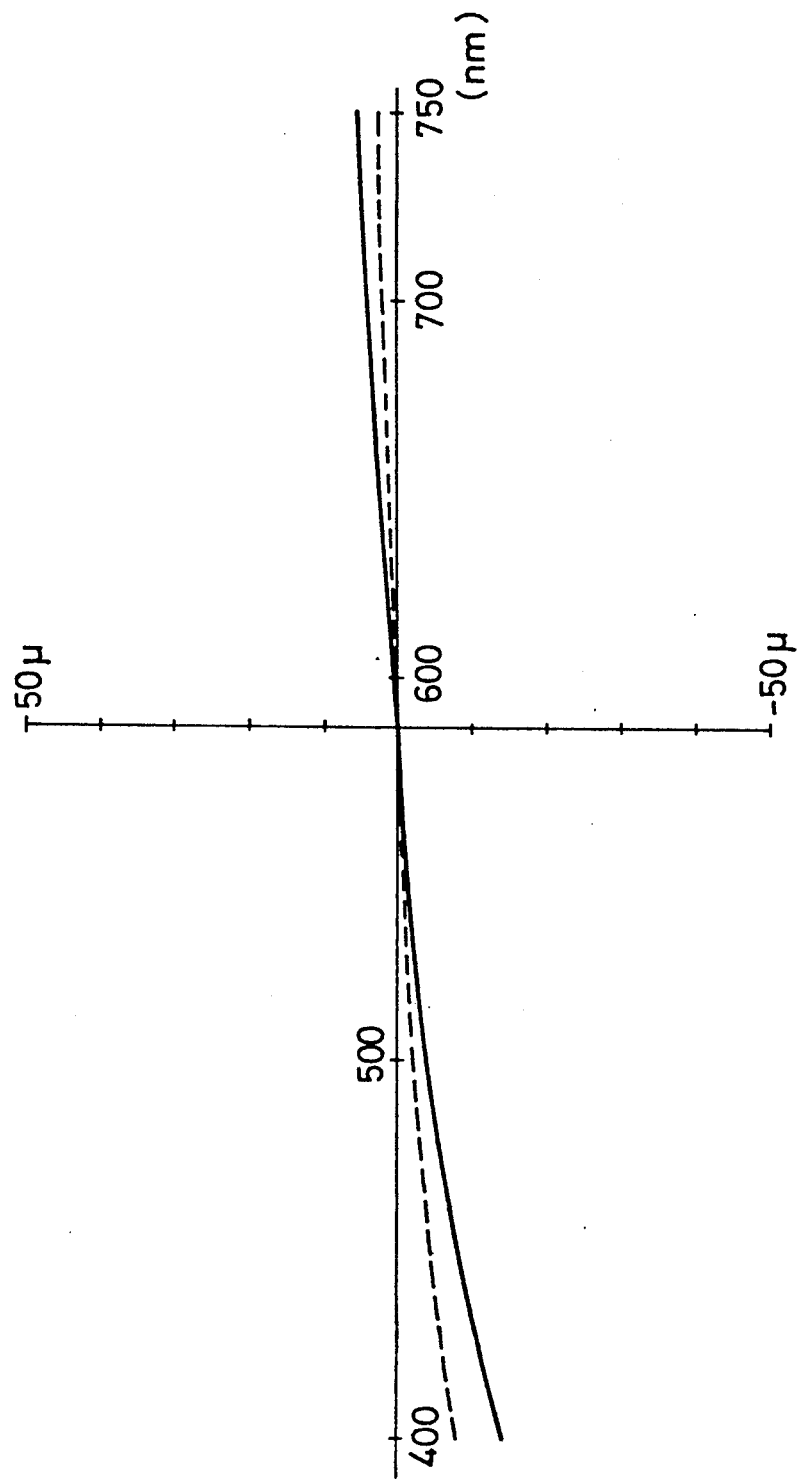
FIG. 7 is a graph showing difference in generation of chromatic aberration depending on wavelength.
Figure 8:
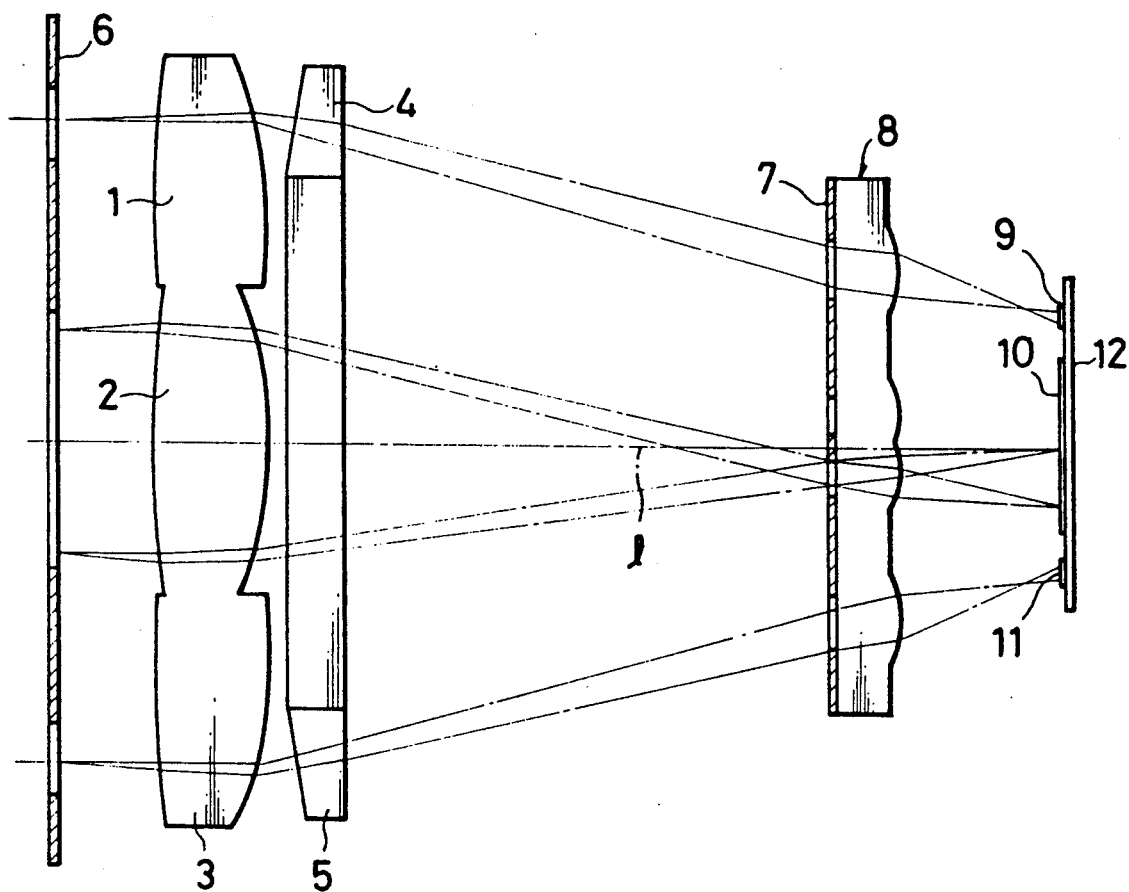
FIG. 8 is a schematic view showing an optical system of a focal point detecting optical system, in which a prism is disposed behind a condenser lens.
Figure 9:
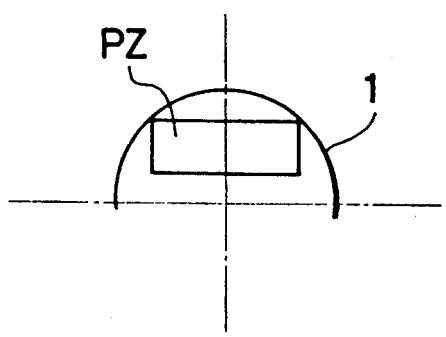
FIG. 9 is a schematic view showing a relation betweend a condenser lens and a passing zone of beam of light in FIG. 8.

FIG. 7 is graph showing a lateral chromatic aberration on the sensor between the constitution of FIG. 6 and that of FIG. 1. In the figure, the solid line shows the reference example of FIG. 6 and the broken line shows the embodiment of FIG. 1. It will be understood from FIG. 7 that the lateral chromatic aberration can be reduced to about a half by modifying the arrangement of the prism.

Since this lateral chromatic aberration appears in a direction perpendicular to the arranging direction of elements of the CCD line sensor 10, there is almost no problem. However, it is more preferable that the generating quantity of the aberration is small so that problems unknown yet can be prevented from being arisen beforehand.

As described in the foregoing, according to a focal point detecting optical apparatus of the present invention, even in case the optical path of the focal point detecting optical path outside the optical axis is deflected in order to make the substrate for a light receiving element to be placed thereon small, the deflecting angle can be formed smaller than the prior art.

Therefore, accuracy of the adjustment of the light receiving element in the optical axis direction is not required to be so strict as in the prior art.

Also, the vertical angle of the prism can be formed comparatively small and the thickness thereof can be restrained.

Further, in case the prism is made almost as thick as the prior art, the desired vertical angle can be obtained without additionally employing the prism function due to accentricity of the condenser lens. Therefore, there can be used the area in the vicinity of the optical axis of the condenser lens as a passing area of beam of light and there can be obtained an effective diameter of the lens without making the central thickness thereof. In addition, there can be reduced the aberration.

On the other hand, since a light deflecting means is disposed in the vicinity of an imaging surface on which an object is imaged by a taking lens, there can be restrained the occcurrence of chromatic aberration on a light receiving element.

What is claimed is:

1. A focal point detecting optical apparatus comprising:

a first focal point detecting optical system, positioned along an optical axis, for reimaging a portion of a primary image formed in the vicinity of an optical axis through a taking lens onto a first line sensor, said portion of said primary image being reimaged as a pair of images, said firt focal point detecting optical system further comprising means for detecting a focusing state in the vicinity of the optical axis, a second focal point detecting optical system positioned outside of said optical axis for reimaging a portion of said primary image which is formed outside of the optical axis onto a second line sensor, said second focal point detecting optical system comprising means for detecting a focusing state exteriorly of the optical axis; and light deflecting means positioned to minimize distance between an imaging surface on which said primary image is formed and said light deflecting means, and disposed between a taking lens forming part of a taking optical system, and a condenser lens forming part of said focal point detecting optical systems, said light deflecting means comprising means for deflecting said primary image portion located outside of the optical axis toward said optical axis.

2. A focal point detecting system according to claim 1, wherein said second focal point detecting optical system comprises two systems which are disposed along opposite sides of said first focal point detecting optical system along said optical axis.

3. A focal point detecting optical system according to claim 1, wherein said light deflecting means is a rigid block including a prism for deflecting the beam of light outside the optical axis and a parallel plane portion for permitting the beam of light in the vicinity of the optical axis to pass therethrough.

4. A focal point detecting optical system according to claim 3, wherein the central thickness of said prism portion and the thickness of said parallel plane portion are generally equal to each other.

5. A focal point detecting optical apparatus comprising:
- a firt focal point detecting optical system, positioned along an optical axis, for reimaging a primary image, formed in the vicinity of an optical axis through a taking lens, onto a first line sensor, said primary image portion being reimaged as a pair of images, said first focal point detecting optical system further comprising means for detecting a focusing state in the vicinity of said optical axis;
- a second focal point detecting optical system, positioned exteriorly of said optical axis, for reimaging a portion of said primary image which is formed exteriorly of said optical axis, onto a second line sensor, said second focal point detecting optical system comprising means for detecting a focusing state exteriorly of said optical axis; and
- light deflecting means positioned to minimize distance between an imaging surface on which said primary image is formed and said light deflecting means, said light deflecting means comprising means for deflecting said primary image portion located exteriorly of said optical axis towards said optical axis.

6. A focal point detecting optical apparatus comprising:
- a first focal point detecting optical system, positioned along an optical axis, for reimaging a portion of a primary image formed in the vicinity of an optical axis through a taking lens onto a first line sensor, said portion of said primary image being reimaged as a pair of images, said first focal point detecting optical system further comprising means for detecting a focusing state in the vicinity of the optical axis,
- a second focal point detecting optical system positioned outside of said optical axis for reimaging a portion of said primary image which is formed outside of the optical axis onto a second line sensor, said second focal point detecting optical system comprising means for detecting a focusing state exteriorly of the optical axis; and
- light deflecting means disposed a distance from an imaging surface on which said primary image is formed by the taking lens, said distance corresponding to the minimum lateral chromatic aberration of the primary image as it passes through said deflecting means,
- said light deflecting means further disposed between a taking lens forming part of a taking optical system and a condenser lens forming part of said focal point detecting optical systems, and comprising means for deflecting said primary image portion located outside of the optical axis toward said optical axis.

7. A focal point detecting optical apparatus comprising:
- a first focal point detecting optical system, positioned along an optical axis, for reimaging a portion of a primary image formed in the vicinity of an optical axis through a taking lens onto a first line sensor, said portion of said primary image being reimaged as a pair of images, said first focal point detecting optical system further comprising means for detecting a focusing state in the vicinity of the optical axis,
- a second focal point detecting optical system positioned outside of said optical axis for reimaging a portion of said primary image which is formed outside of the optical axis onto a second line sensor, said second focal point detecting optical system comprising means for detecting a focusing state exteriorly of the optical axis; and
- light deflecting means disposed a distance from an imaging surface on which said primary image is formed by the taking lens, said distance corresponding to the minimum lateral chromatic aberration of the primary image as it passes through said deflecting means,
- said light deflecting means comprising means for deflecting said primary image portion located outside of the optical axis toward said optical axis.

8. A focal point detecting optical apparatus comprising:
- a first focal point detecting optical system, positioned along an optical axis, for reimaging a first portion of a primary image, formed in the vicinity of an optical axis, through a taking lens forming part of a taking optical system and a condenser lens forming part of said focal point detecting optical system onto a first line sensor, said first portion of said primary image being reimaged as a pair of images, said first focal point detecting optical system further comprising means for detecting a focusing state in the vicinity of the optical axis,
- a second focal point detecting optical system positioned outside of said optical axis for reimaging a second portion of said primary image which is formed outside of the optical axis through said taking lens and said condenser lens onto a second line sensor, said second focal point detecting optical system comprising means for detecting a focusing state exteriorly of the optical axis; and
- light deflecting means disposed between said taking lens and said condenser, positioned a distance from said condenser, said light deflecting means comprising means for deflecting said primary image portion located outside of the optical axis toward said optical axis.

9. A focal point detecting optical system according to claim 8, wherein said light deflecting means is mounted separately from said condenser.

* * * * *

UNITED STATES PATENT AND TRADEMARK OFFICE
CERTIFICATE OF CORRECTION

PATENT NO. : 5,017,005
DATED : May 21, 1991
INVENTOR(S) : O. SHINDO

It is certified that error appears in the above-indentified patent and that said Letters Patent is hereby corrected as shown below:

At column 6, line 40 (claim 6, line 8), change "firt" to ---first---.

At column 7, line 10 (claim 5, line 3), change "firt" to ---first---.

Signed and Sealed this

Eighth Day of October, 1996

Attest:

BRUCE LEHMAN

Attesting Officer  Commissioner of Patents and Trademarks